US009863449B2

(12) United States Patent
Heybroek et al.

(10) Patent No.: US 9,863,449 B2
(45) Date of Patent: Jan. 9, 2018

(54) HYDRAULIC SYSTEM AND A METHOD FOR CONTROLLING A HYDRAULIC SYSTEM

(75) Inventors: Kim Heybroek, Strängnäs (SE); Roland Wiktor, Hameln (DE)

(73) Assignee: Volvo Construction Equipment AB, Eskilstuna (SE)

( * ) Notice: Subject to any disclaimer, the term of this patent is extended or adjusted under 35 U.S.C. 154(b) by 914 days.

(21) Appl. No.: 14/123,122

(22) PCT Filed: May 31, 2011

(86) PCT No.: PCT/SE2011/000106
§ 371 (c)(1),
(2), (4) Date: Dec. 15, 2013

(87) PCT Pub. No.: WO2012/166022
PCT Pub. Date: Dec. 6, 2012

(65) Prior Publication Data
US 2014/0123634 A1    May 8, 2014

(51) Int. Cl.
*E02F 9/22* (2006.01)
*F15B 13/02* (2006.01)
(Continued)

(52) U.S. Cl.
CPC ............ *F15B 13/02* (2013.01); *E02F 9/2217* (2013.01); *E02F 9/2235* (2013.01); *E02F 9/2242* (2013.01); *E02F 9/2296* (2013.01); *F15B 11/00* (2013.01); *F16H 61/4096* (2013.01); *F15B 2211/20546* (2013.01); *F15B 2211/214* (2013.01); *F15B 2211/26* (2013.01); *F15B 2211/625* (2013.01);
(Continued)

(58) Field of Classification Search
CPC ..... E02F 9/2242; E02F 9/2217; E02F 9/2235; F15B 13/02; F15B 11/00; F16H 61/4096
See application file for complete search history.

(56) References Cited

U.S. PATENT DOCUMENTS

| 6,360,536 B1 | 3/2002 | Prabhu et al. |
| 2004/0107699 A1* | 6/2004 | Fales ...................... F15B 21/14 60/414 |

(Continued)

OTHER PUBLICATIONS

European Search Report dated (Oct. 6, 2015) for corresponding European App. 15171890.5.
(Continued)

*Primary Examiner* — Logan Kraft
*Assistant Examiner* — Abiy Teka
(74) *Attorney, Agent, or Firm* — WRB-IP LLP

(57) ABSTRACT

A hydraulic system for a working machine includes a hydraulic actuator and a first hydraulic machine for supplying fluid to the hydraulic actuator. The hydraulic system further includes a hydraulic transformer for supplying fluid to the hydraulic actuator in parallel with the first hydraulic machine, and an accumulator for fluid. The hydraulic transformer includes a first port and a second port and the transformer is adapted to transform a first pressure and a first flow at the first port to a second pressure and a second flow at the second port. The second port of the hydraulic transformer is in fluid communication with the hydraulic actuator and the first port is in communication with the accumulator.

15 Claims, 8 Drawing Sheets

(51) Int. Cl.
*F16H 61/4096* (2010.01)
*F15B 11/00* (2006.01)
(52) U.S. Cl.
CPC ......... *F15B 2211/6303* (2013.01); *F15B 2211/6313* (2013.01); *F15B 2211/6346* (2013.01); *F15B 2211/6655* (2013.01)

(56) References Cited

U.S. PATENT DOCUMENTS

| | | | | |
|---|---|---|---|---|
| 2007/0079609 | A1* | 4/2007 | Brinkman | E02F 9/2217 60/413 |
| 2007/0119161 | A1* | 5/2007 | Du | F16H 61/433 60/451 |
| 2008/0104955 | A1 | 5/2008 | Khalil | |
| 2009/0266067 | A1* | 10/2009 | Persson | F15B 21/14 60/327 |

OTHER PUBLICATIONS

International Search Report dated (Feb. 27, 2012) for corresponding International Application PCT/SE2011/000106.

* cited by examiner

HYDRAULIC SYSTEM AND A METHOD FOR CONTROLLING A HYDRAULIC SYSTEM

The present invention relates to a hydraulic system. Moreover, the present invention relates to a method for controlling a hydraulic system.

Hydraulic systems may be used in many fields of technology. For instance, many types of work machines, such as wheel loaders, excavators or the like, are often furnished with at least one hydraulic system.

A hydraulic system generally comprises a hydraulic machine, e.g. hydraulic pump, which is adapted to supply hydraulic power, i.e. hydraulic flow and/or hydraulic pressure, to the hydraulic system and the hydraulic machine is often powered by a power source, such as an engine or an electric motor. When the hydraulic system is installed in a work machine, the hydraulic machine is often powered by the prime mover of the work machine.

In a work machine, the hydraulic machine may be powered by the power source via a power take-off which is located between the power source and a transmission arrangement, such as a gear box. The transmission arrangement may in turn be connected to e.g. wheels of the work machine for the propulsion thereof.

A hydraulic system is generally requested to perform a working operation which requires a certain hydraulic power from the hydraulic machine. The required power from the hydraulic machine in turns requires a certain power from the power source. The amount of power supplied from the power source is generally dependent on the engine speed and the supplied torque of the power source. The engine speed of the power source may in many cases be governed by other functional requirements of the work machine than the requirements of the hydraulic system. For instance, the engine speed may be governed by the desired speed of the work machine. As such, in order to obtain a desired hydraulic power from the hydraulic machine, the displacement of the hydraulic machine is often adjusted. This in turn implies that the required torque from the power source is altered.

However, if the power required from the power source is large, there is a risk that engine will work under undesired operating conditions. Purely by way of example, if the required torque is significantly larger than the torque that would have been obtained for the required engine speed when the power source is operated in a normal operating condition, there is a risk that the power source will not function in a desired manner. If the required torque is too large, there is even a risk that the power source will stop. In other words; the engine can stop due to overload caused by the hydraulic system, particularly when the rotation speed of the engine is low.

Furthermore, the combination of a required engine speed, in order to e.g. obtain a desired speed of the work machine, and the required torque, in order to obtain a desired power supply to the hydraulic machine, can result in an undesired operating condition for the power source.

In an attempt to solve the above problem, U.S. 200910266067 A1 proposes that an additional hydraulic machine is connected to the first hydraulic machine and that the additional hydraulic machine may also be in fluid communication with an accumulator. As such, when a large hydraulic power is requested from the first hydraulic machine, pressurized fluid in the accumulator may be used for driving the additional hydraulic machine such that the additional hydraulic machine imparts a torque on the first hydraulic machine in addition to the torque provided by a power source, e.g. a prime mover.

However, in certain operations, the working operation may require a relatively low hydraulic power, which the first hydraulic machine of '067 system is capable of producing by the power supplied by the prime mover alone, but where the requested relative power may nevertheless adversely effect the prime mover. For instance, the magnitude of the requested relative power may vary in time which in turn will result in a varying torque request from the prime mover.

An example of such an operation is when a bucket of a wheel loader is forced through soil which also contains rocks. In the above example, in order to obtain a smooth movement of the bucket, the level of the requested power may vary over time. In other words, a requested power signal may include transients. This in turn implies that the requested power, and in particular the torque, from the power source may vary over time and the variation of the requested power, depending on the amplitude and/or frequency of the variation, may result in that the function and/or life of the power source is impaired.

It is desirable to provide a hydraulic system, defined by way of introduction, which system overcomes or reduces the problem of prior art systems that the function is impaired and/or the life of the power source is reduced as a result of temporal variations in the hydraulic power required to perform a certain working operation.

As such, an aspect of the present invention relates to a hydraulic system for a working machine. The hydraulic system comprises a hydraulic actuator and a first hydraulic machine for supplying fluid to the hydraulic actuator. The hydraulic system further comprises a hydraulic transformer for supplying fluid to the hydraulic actuator in parallel with the first hydraulic machine.

The hydraulic system further comprises an accumulator for fluid. The hydraulic transformer comprises a first port and a second port and the transformer is adapted to transform a first pressure and a first flow at the first port to a second pressure and a second flow at the second port. Preferably, the hydraulic transformer is also adapted to transform a first pressure and a first flow at the second port to a second pressure and a second flow at the first port.

The second port of the hydraulic transformer is in fluid communication with the hydraulic actuator and the first port is in communication with the accumulator. The hydraulic system further comprises a hydraulic actuator control means that is adapted to determine a required hydraulic power for the hydraulic actuator.

According to the present invention, the hydraulic actuator control means is further adapted to request a first power portion of the required hydraulic power from the hydraulic transformer and a second power portion of the required hydraulic power from the first hydraulic machine.

A hydraulic system according to the present invention implies that the hydraulic power required from the first hydraulic machine may be controlled such that the power source which is connected to the first hydraulic machine may be operated within preferred, or at least not undesired, operation ranges.

As used herein, the expression "hydraulic power" relates to a hydraulic flow and/or pressure of the hydraulic fluid.

Optionally, the hydraulic system comprises a first conduit assembly and the first hydraulic machine is adapted to supply fluid to the hydraulic actuator via the first conduit assembly. Moreover, the second port of the hydraulic transformer may be in fluid communication with the first conduit assembly.

Optionally, the hydraulic actuator control means is adapted to determine a required hydraulic power signal and to convert the required hydraulic power signal into at least one of a high frequency power signal and a low frequency power signal. The conversion of the required hydraulic power signal into a high and/or low frequency signal implies that the first hydraulic machine may be operated so as to provide hydraulic power which has a low amount of transients, meaning that the hydraulic power provided by the first hydraulic machine preferably has slow temporal variations.

Optionally, the hydraulic actuator control means comprises a hydraulic signal filter.

Optionally, the hydraulic actuator control means is adapted to determine a required hydraulic power electronic signal, the hydraulic actuator control means further comprises an electronic filter.

Optionally, the high frequency power signal includes a portion of the required hydraulic power signal which contains frequencies of the required hydraulic power signal which are equal to or above a cut-of frequency which is in the range of 1-10 Hz, preferably within the range of 3-6 Hz, and the low frequency power signal includes a portion of the required hydraulic power signal which includes frequencies of the required hydraulic power signal which are below the cut-of frequency.

Optionally, the system comprises a time delay means adapted to delay a response of the first hydraulic machine. The time delay means implies that the first hydraulic machine may be operated so as to provide hydraulic power which has a low amount of transients, i.e. that the hydraulic power provided by the first hydraulic machine preferably has slow temporal variations. Transients in the hydraulic power may instead preferably be dealt with by the hydraulic transformer.

Optionally, the system comprises a torque determining means, the torque determining means being adapted to determine a required torque signal for the first hydraulic machine in response to the required hydraulic power, the required torque signal including only frequencies which are below a cut-of frequency which is in the range of 1-10 Hz, preferably within the range of 3-6 Hz, more preferred the required torque signal is constant in time.

By virtue of a torque determining means, torque ranges which are suitable for a power source and/or a transmission arrangement connected to the first hydraulic machine may be predetermined. Thus, the first hydraulic machine may be operated so as to request a torque from the power source and/or a transmission arrangement which torque lies within the predetermined torque ranges.

Optionally, the system further comprises an accumulator pressure sensor adapted to determine a pressure in the accumulator, the hydraulic actuator control means being adapted to increase the pressure in the accumulator, by operating the first hydraulic machine, when the pressure in the accumulator is below a predetermined pressure value.

A second aspect of the present invention relates to a work machine comprising a hydraulic system according to the first aspect of the present invention. Purely by way of example, the work machine may be a wheel loader or an excavator.

Optionally, the work machine comprises an engine, preferably an internal combustion engine, which is adapted to drive the first hydraulic machine.

A third aspect of the present invention, relates to a method for controlling a hydraulic system. The hydraulic system comprises a hydraulic actuator and a first hydraulic machine for supplying hydraulic fluid to the hydraulic actuator. Moreover, the hydraulic system comprises a hydraulic transformer for supplying fluid to the hydraulic actuator in parallel with said first hydraulic machine, and an accumulator for fluid. The hydraulic transformer comprises a first port and a second port and is adapted to transform a first pressure and a first flow at said first port to a second pressure and a second flow at said second port. The second port of the hydraulic transformer is in fluid communication with the hydraulic actuator and the first port is in fluid communication with the accumulator. Moreover, the hydraulic system comprises a hydraulic actuator control means for determining a required hydraulic power for said hydraulic actuator and the method comprising determining a required hydraulic power for the hydraulic actuator using the hydraulic actuator control means.

Moreover, the method according to the third aspect of the present invention comprising: requesting a first power portion of the required hydraulic power from the hydraulic transformer, and
requesting a second power portion of the required hydraulic power from the first hydraulic machine.

A method according to the present invention implies that the hydraulic power required from the first hydraulic machine may be controlled such that the power source which is connected to the first hydraulic machine may be operated within preferred, or at least not undesired, operation ranges.

Optionally, the method comprises:
determining a required hydraulic power signal and converting the required hydraulic power signal into at least one of a high frequency power signal and a low frequency power signal.

Optionally, the method comprises:
delaying the request of the second power portion for a predetermined delay time.

Optionally, the first hydraulic machine is adapted to be driven by an engine, the engine being adapted to impart a torque on the first hydraulic machine, the method comprising:
determining a requested torque from the engine, and
issuing a signal to the engine such that the requested torque is obtained.

Optionally, the method further comprises:
determining a pressure in the accumulator;
if the pressure in the accumulator is below a predetermined pressure value, operating the first hydraulic machine such that the pressure in the accumulator increases.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings

DETAILED DESCRIPTION OF EXAMPLE EMBODIMENTS OF THE INVENTION

Figure 1:
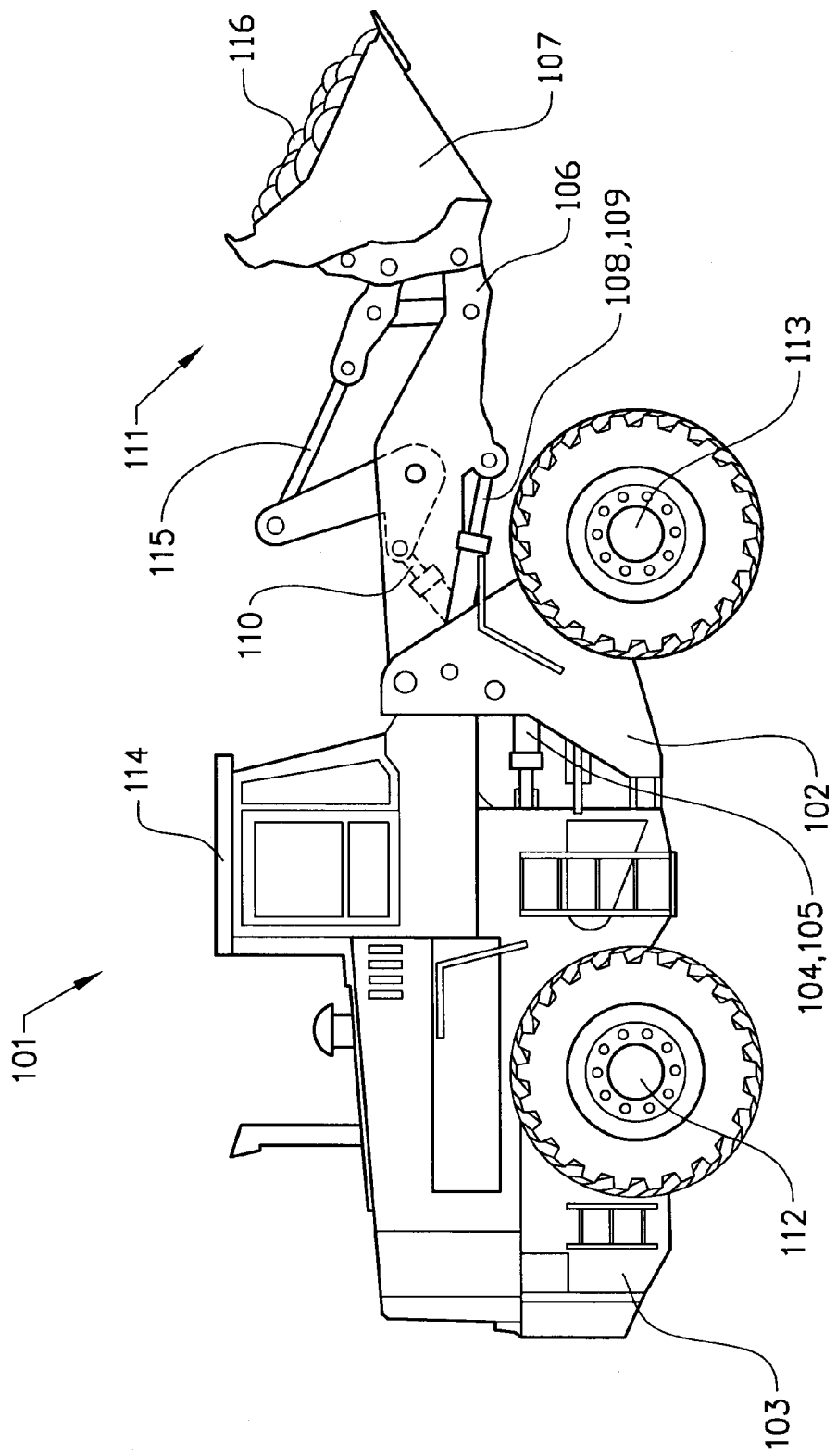
FIG. 1 illustrates a work machine hosting a hydraulic system.

The invention will below be described for a working machine in the form of a wheel loader 101. The wheel loader 101 should be seen as an example of a working machine to which the hydraulic system according to the invention can be applied. The wheel loader 101 comprises a front vehicle section 102 and a rear vehicle section 103. Each of these vehicle sections 102, 103 comprise a frame and wheels arranged on a drive axle 112, 113. The rear vehicle section 103 comprises an operator cab 114. The vehicle sections 102, 103 are connected to each other in such a way that they can be pivoted relative to each other about a vertical axis by means of two hydraulic cylinders 104, 105, called steering cylinders, which are connected to the two vehicle sections 102, 103. Accordingly, the hydraulic cylinders 104, 105 are disposed on different sides of a centre line, extending in the longitudinal direction of the vehicle, for steering or turning the wheel loader 101 by means of the hydraulic cylinders. In other words, the wheel loader 101 is frame-steered.

The wheel loader 101 comprises a lift arm assembly 111 for handling objects or (loose) material such as gravel. The lift arm assembly 111 comprises a lift-arm unit 106 and an implement 107 in the form of a bucket, which is mourned on the lift arm unit 106. Here, the bucket 107 is filled with material 116. A first end of the lift arm unit 106 is pivotally connected to the front vehicle section 102 in order to achieve a lifting movement of the bucket. The bucket 107 is pivotally connected to a second end of the lift arm unit 106 in order to achieve a tilting movement of the bucket. The lift arm unit 106 can be raised and lowered relative to the front section 102 of the vehicle by means of two hydraulic cylinders 108, 109. Each hydraulic cylinder 108, 109 is connected at a first end to the from vehicle section 102 and at the second end to the lift arm unit 106. The bucket 107 can be tilted relative to the lift arm unit 106 by means of an additional hydraulic cylinder 110, called a tilting cylinder, which is connected at a first end to the front vehicle section 102 and connected at the second end to the bucket 107 via a link arm system 115.

Figure 2:
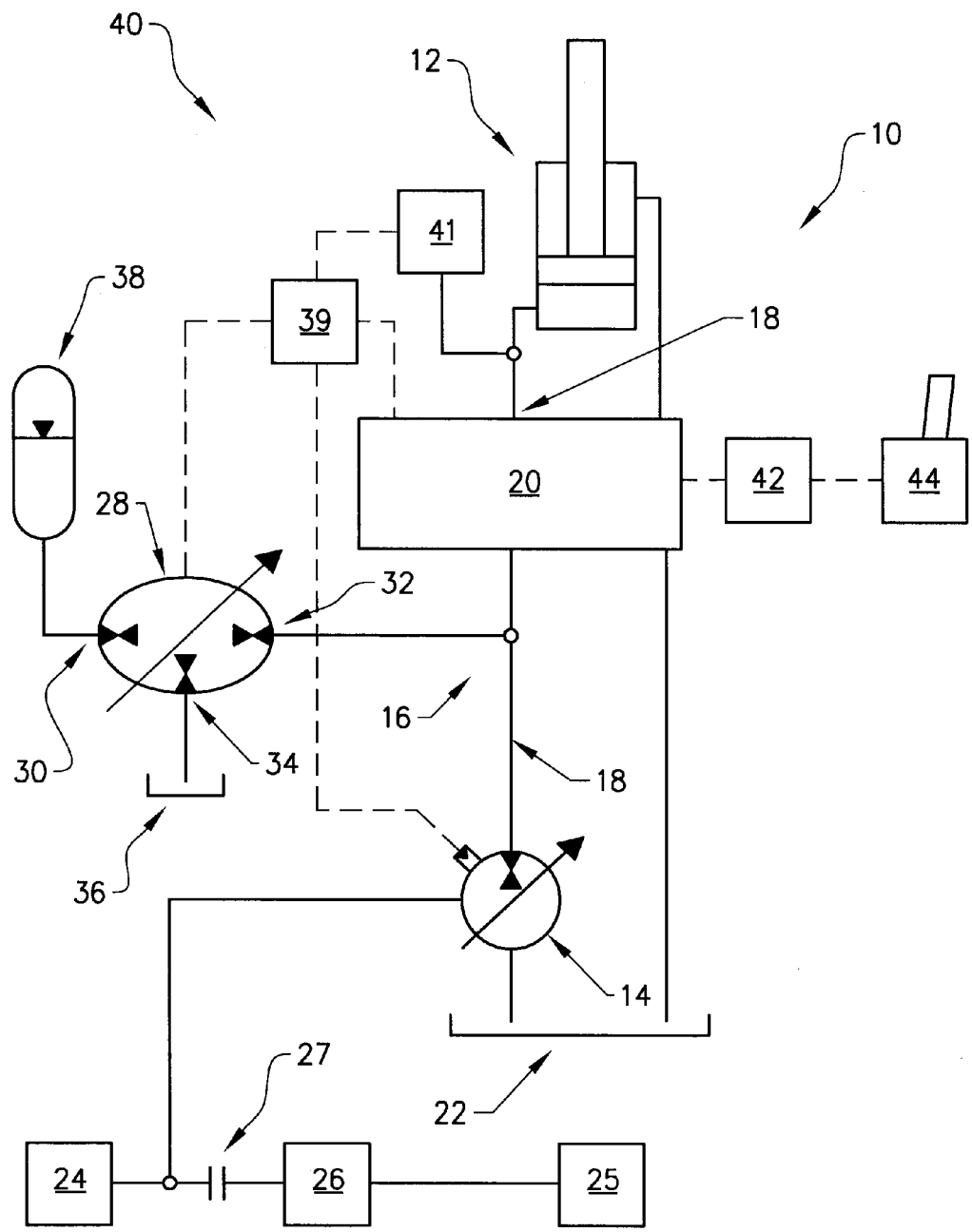
FIG. 2 illustrates an embodiment of a hydraulic system.

FIG. 2 is a schematic illustration of an embodiment of a hydraulic system 10 of the present invention. As may be gleaned from FIG. 2, the hydraulic system 10 comprises a hydraulic actuator 12 and a first hydraulic machine 14 for supplying fluid to the hydraulic actuator 12. The first hydraulic machine 14 may for instance be a hydraulic pump or a hydraulic pump and a hydraulic motor. Moreover, the hydraulic actuator 12 may for instance be a linear or rotary actuator. Purely by way of example, the hydraulic actuator 12 may be one of the two hydraulic cylinders 108, 109 of the FIG. 1 wheel loader 101. In other embodiments of the present invention, the hydraulic system could comprise two or more hydraulic actuators (not shown in FIG. 2).

The first hydraulic machine 4 is adapted to supply fluid to the hydraulic actuator 12. In the embodiment illustrated in FIG. 2, the above supply is achieved by virtue of a first conduit assembly 16. However, in other embodiments of the invention, the supply of fluid from the first hydraulic machine 14 to the hydraulic actuator 12 may be obtained by other supplying means (not shown in FIG. 2), or a supplier. The first conduit assembly 16 generally comprises one or more conduits 18 and a main control valve 20. In embodiments of the present invention which comprise a plurality of hydraulic actuators (not shown FIG. 2), at least two, but preferably, all of the plurality of the hydraulic actuators may be connected to the main control valve 20.

Further, the first hydraulic machine 14 is adapted to be in fluid communication with a first tank portion 22 such that the first hydraulic machine can draw hydraulic fluid from the first tank portion 22. As used herein, the term hydraulic fluid is intended to include hydraulic oil as well as any other fluids which possibly may occur in a hydraulic system.

The first hydraulic machine 14 is adapted to be powered, or to be driven, by a power source 24. The power source 24 may preferably comprise an engine, such as an internal combustion engine. However, in other embodiments of the present invention, the power source 24 may comprise a gas turbine, an electric motor or a fuel cell. Moreover, the power source 24 may often be a prime mover of a working machine hosting the hydraulic system 10.

When the power source 24 is the prime mover of a working machine, the power source 24 may be adapted to be connected to one or more wheels 25 of the working machine. Preferably, the power source 24 and the one or more wheels 25 are connected to one another via a transmission arrangement. The transmission arrangement may be a gear assembly 26 which for instance may be a hydraulic and/or mechanic gear assembly. Moreover, a work, machine may comprise a torque converter or clutch 27 located between the power source 24 and the gear assembly 20. The connection (power take off) between the power source 24 and the first hydraulic machine 14 may be located between the power source 24 and the clutch 27.

The power source 24 and the first hydraulic machine 14 may be connected to one another via a further transmission arrangement (not shown in FIG. 2).

Moreover, the hydraulic system 10 comprises a hydraulic transformer 28 for supplying fluid to the hydraulic actuator 12 in parallel with the first hydraulic machine 14. The hydraulic transformer 28 comprises a first port 30 and a second port 32. The hydraulic transformer 28 is adapted to transform a first pressure and a first flow at the first port 30 to a second pressure and a second flow at the second port 32. Preferably, the hydraulic transformer 28 is also adapted to transform a first pressure and a first flow at the second port 32 to a second pressure and a second flow at the first port 30. The second port 32 of said hydraulic transformer 28 is in fluid communication with the hydraulic actuator 12. In the embodiment illustrated in FIG. 2, the above communication is achieved by arranging the second port 32 of the hydraulic transformer 28 in parallel with the first hydraulic machine 14 in the first conduit assembly 16.

In the implementation of the hydraulic transformer 28 illustrated in FIG. 2, the transformer 28 further comprises a third port 34 which is fluid communication with a second tank portion 36. The first tank portion 22 and the second tank portion 36 may, depending on the design of the hydraulic system, be separate tanks which may or may not be in fluid communication with one another. In further implementations, the first and the second tank portions 22, 36 may actually be one and the same tank.

FIG. 2 further illustrates that the hydraulic system 10 comprises an accumulator 38 for fluid which is adapted to be in fluid communication with the first port 30 of the hydraulic transformer 28. The accumulator 38 may be any kind of vessel which is adapted to store fluid which is delivered from the first port 30 of the hydraulic transformer 28. Preferably, the accumulator 38 may designed so as to accommodate at least one fluid at a relatively high pressure. Purely by way of example, the accumulator 38 may be designed for an internal pressure of at least 50 bars. Again purely by way of example, the accumulator 38 may be a hydraulic or a pneumohydraulic accumulator. Furthermore, in other embodiments of the hydraulic system 10, the first port 30 of the hydraulic transformer 28 may be in fluid communication with a plurality of accumulators (not shown).

Moreover, the hydraulic system 10 comprises a hydraulic actuator control means 40, or a controller, which is adapted to determine a required hydraulic power for the hydraulic actuator 12. As has been intimated hereinabove, the expression "hydraulic power" relates to a flow and/or pressure of the hydraulic fluid.

The hydraulic actuator control means 40 may preferably comprise a hydraulic actuator control member 39. Moreover, the control means 40 may comprise a pressure sensor and/or a flow sensor 41. The sensor 41 may be adapted to measure the flow and/or the pressure at the hydraulic actuator 12. Moreover, the sensor 41 may be adapted to communicate the flow and/or the pressure thus determined to other portions of the hydraulic actuator control means 40 such as the hydraulic actuator control member 39. The sensor 41 and the control member 39 may for instance comprise electronic, optical and/or hydraulic means. Moreover, the hydraulic actuator control means 40 may preferably be connected to a control unit 42 which in turn may be connected to an actuator 44 adapted to actuate the hydraulic actuator 12.

The hydraulic actuator control means 40 may comprise a plurality of components in embodiments of the hydraulic system 10 of the present invention. Purely by way of example, the implementation of the hydraulic actuator control means 40 illustrated in FIG. 2 comprises the pressure sensor and/or a flow sensor 41 as well as the hydraulic actuator control member 39. Moreover, in further embodiments of the hydraulic system presented hereinbelow, the hydraulic actuator control means 40 may for instance comprise filtering means, time delay means and/or torque determining Deans (not shown in FIG. 2).

Figure 8:
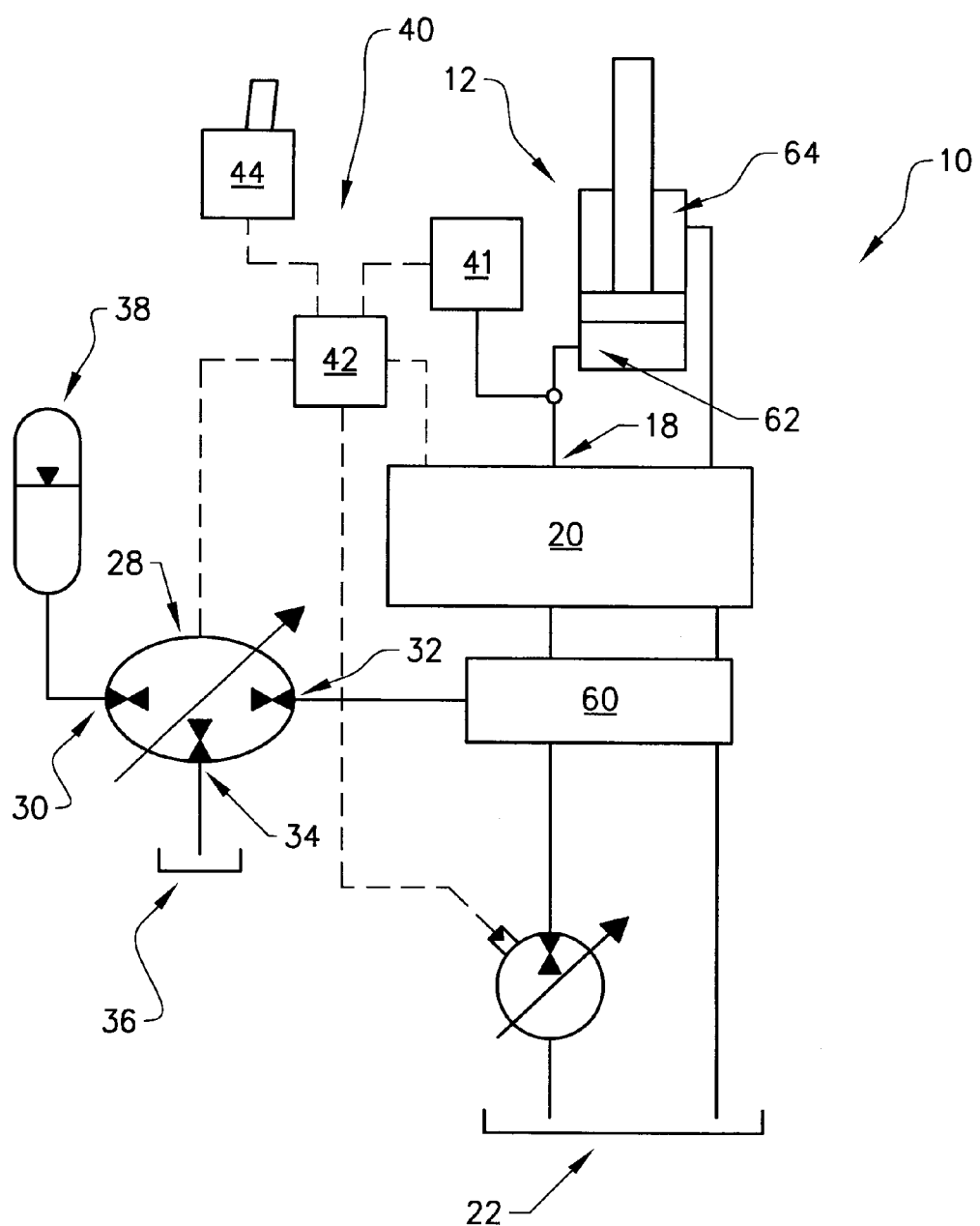
FIG. 8 illustrates a further embodiment of a hydraulic system.

The hydraulic actuator control means 40 may be directly or indirectly connected to the control unit 42. In the FIG. 2 embodiment of the hydraulic system 10, the control unit 42 is connected to the main control valve 20 which in turn is connected to the hydraulic actuator control means 40. In FIG. 2, the control unit 42 is thus indirectly connected to the control member 39. As such, in the embodiment illustrated in FIG. 2, the control unit 42 may be in communication with adjusting members, such as valves (not shown), of the main control valve 20 in order to control the flow to and from the hydraulic actuator 12. Instead of, or in addition to, communicating with adjusting members of the main control valve 20, the control unit 42 may communicate directly with, or even form a part of, the hydraulic actuator control means 40 such that the first hydraulic machine 14 and the hydraulic transformer 28 are operated so as to produce a required hydraulic pressure and hydraulic flow. An example of such an implementation is illustrated in FIG. 8.

Figure 3A:
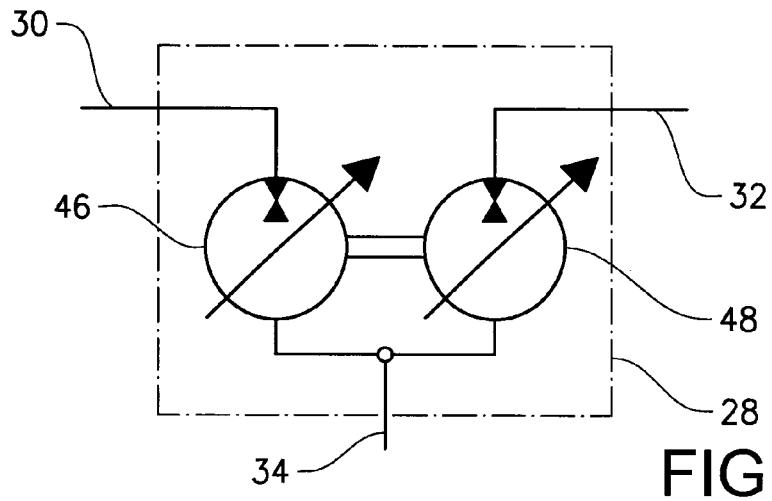
FIG. 3A-3C illustrate various implementations of a hydraulic transformer.
Figure 3B:
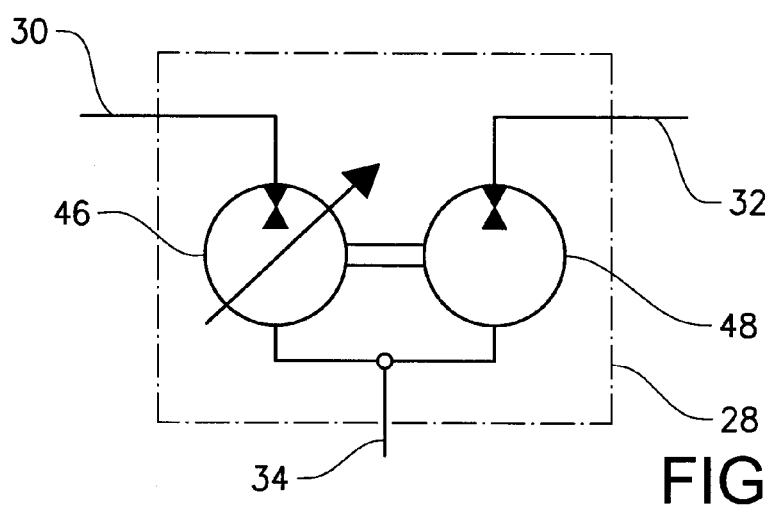
Figure 3C:
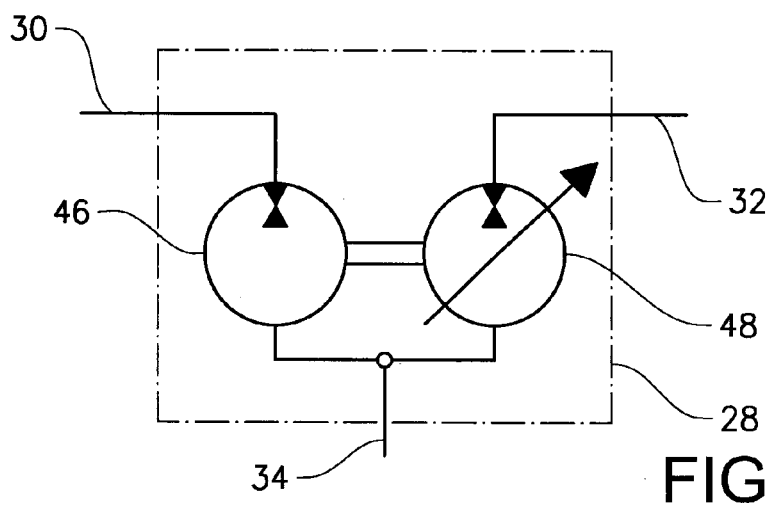

Various implementations of the hydraulic transformer 28 are presented in FIG. 3A to FIG. 3C. As has previously been concluded, the hydraulic transformer 28 is adapted to transform a first pressure and a first flow at the first port 30 to a second pressure and a second flow at the second port 32 and vice versa. Implementations of transformers 28 are illustrated in each one of FIG. 3A, FIG. 3B and FIG. 3C.

FIG. 3A illustrates that an implementation of a transformer 28 may comprise a second hydraulic machine 46 and as third hydraulic machine 48. The second and third hydraulic machines are mechanically connected to one another and at least one of the hydraulic machines 46, 48 is a machine with variable displacement. FIG. 3A illustrates an implementation wherein both the hydraulic machines 46, 48 have a variable displacement whereas FIG. 3B illustrates an embodiment wherein the second hydraulic machine 46, but not the third 48, has as variable displacement. Moreover, FIG. 3C illustrates a further embodiment wherein the third hydraulic machine 48, but not the second 46, has a variable displacement.

Hydraulic transformers which are designed by the Dutch company Innas BV could also be mentioned as examples of hydraulic transformers which could be used in a hydraulic system according to the present invention.

The hydraulic actuator control means 40 is adapted to request a first power portion of the required hydraulic power from the hydraulic transformer 28 and a second power portion of the required hydraulic power from the first hydraulic machine 14. In order to obtain the second power portion from the first hydraulic machine 14, at least the displacement of the first hydraulic machine 14 may be controlled. Purely by way of example, if the first hydraulic machine 14 comprises one or more swash plates (not shown), the wash angle of the first hydraulic machine 14 may be adjusted in order to obtain a desired displacement. As has been indicated hereinabove, a change in the displacement of the first hydraulic machine 14 results in a change in the torque required from the power source 24.

Examples of how the division into a first power portion and a second power portion may be achieved are exemplified hereinbelow.

Figure 4:
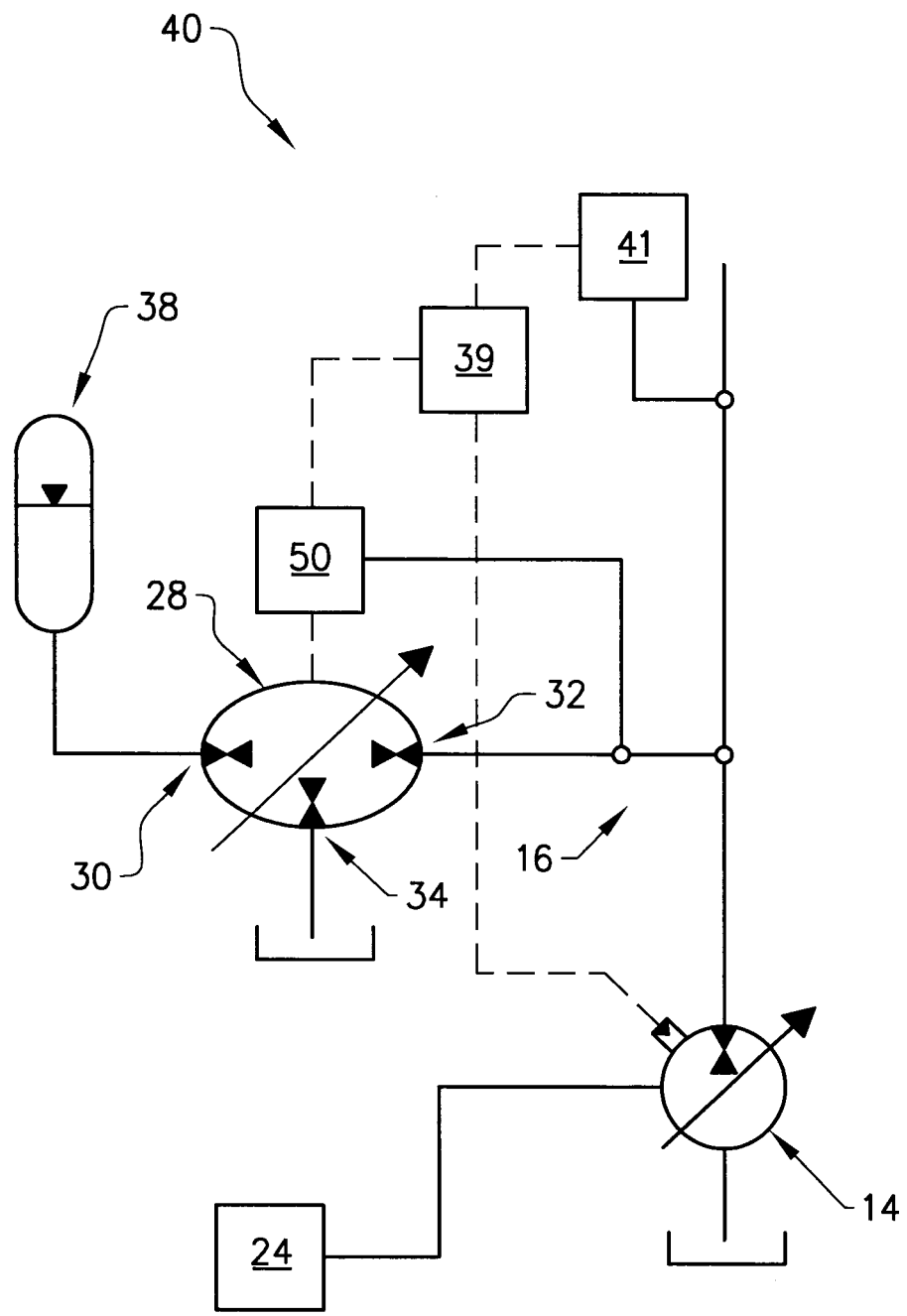
FIG. 4 illustrates a further embodiment of a hydraulic system.

FIG. 4 illustrates a portion of an embodiment of a hydraulic system wherein the hydraulic actuator control means 40 is adapted determine a required hydraulic power signal and to convert the required hydraulic power signal into at least one of a high frequency power signal and a low frequency power signal. As such, based on information concerning at least the flow and/or the pressure at the hydraulic actuator 12 which is detected by the sensor 41, the control means 40 determines a high frequency power signal and/or a low frequency power signal. In the embodiment illustrated in FIG. 4, the hydraulic actuator control member 39 may be adapted to perform the high frequency power signal filtering and/or the low frequency power signal filtering.

In the embodiment illustrated in FIG. 4, the control means 40 is adapted to determine a low frequency power signal and to transmit that signal to the first hydraulic machine 14. Moreover, the control means 40 in FIG. 4 is adapted to transmit the full required hydraulic power signal, i.e. a signal including both high frequency and low frequency components, to the hydraulic transformer 28.

The above separation of the required hydraulic power signal into at least one of a high frequency power signal and a low frequency power signal ma be regarded as a filtering of the required hydraulic power signal and the filtering may be achieved in a plurality of ways.

Purely by way of example, if the sensor 41 is a hydraulic sensor which is adapted to communicate hydraulically with the control member 39, the control member 39 may comprise a hydraulic signal filter and the control member 39 may communicate hydraulically, i.e. via conduits, with the first hydraulic machine 14 as well as the hydraulic transformer 28. Purely by way of example, a hydraulic signal filter may comprise a member which in turn comprises an orifice that is in communication with a second accumulator (not shown). Optionally, a hydraulic signal filter may comprise a small valve acting as a relay. An example of a hydraulic signal filter is presented in WO 97/13072.

In another example, if the sensor 41 is an electronic sensor which is adapted to communicate electronically with the control member 39, or if the control means 40 comprises means for converting, or a convener, a hydraulic signal to an electronic signal, the control means 40 may comprise an electronic signal filter. Purely by way of example, such an electronic signal filter may be hosted by the control member 39. The control means 40 may communicate electronically, i.e. via cables, carries waves or the like, with the first hydraulic machine 14 as well as the hydraulic transformer 28. Purely by way of example, an electronic signal filter may comprise an electronic control unit.

Regardless of whether the filter is a hydraulic filter or an electronic filter, a high frequency power signal preferably includes a portion of the required hydraulic power signal which contains frequencies of the required hydraulic power signal which are equal to or above a cut-of frequency which is in the range of 1-10 Hz, preferably within the range of 3-6 Hz. The low frequency power signal includes a portion of the required hydraulic power signal which includes frequencies of the required hydraulic power signal which are below the cut-of frequency.

Turning again to FIG. 4, based on the hydraulic power determined by the sensor 41, and possibly also based on information from the control unit (not shown in FIG. 4), the control means 40 determines a required hydraulic power signal and a low frequency power signal wherein the required hydraulic power signal is communicated to the hydraulic transformer 28 and the low frequency power signal is communicated to the first hydraulic machine 14.

As such, the first hydraulic machine 14 will be operated so as to provide a hydraulic power which generally has slow variations in time. Consequently, the power source 24 will generally provide a torque to the first hydraulic machine 14 which torque will have slow variations in time. The slow varying torque may be beneficial for the power source 24, in particular when the power source 24 comprises an internal combustion engine.

As has previously been indicated, the control means 40 communicates the full required hydraulic power signal to the hydraulic transformer 28. Moreover, the control means 40 comprises a sensor 50 which is adapted to determine the hydraulic power in the first conduit assembly 16 and to control the hydraulic transformer 28 such that the difference, or at least a hydraulic power which is determined on the basis of the difference, between the full required hydraulic power signal and the hydraulic power in the first conduit assembly 16 is provided by the hydraulic transformer 28.

As such, if the required hydraulic power signal is indicative of a requested hydraulic pressure and/or flow which is larger than the present hydraulic pressure and/or flow in the first conduit assembly 16, the hydraulic transformer 28 is operated so that the pressurized fluid in the accumulator 38 is used for producing a hydraulic pressure and/or flow at the second port 32 of the hydraulic transformer 28 which hydraulic pressure and/or flow is related to the difference between the required hydraulic power and the hydraulic power present in the first conduit assembly 16.

If the required hydraulic power signal is indicative of a requested hydraulic pressure and/or flow which is lower than the present hydraulic pressure and/or flow in the first conduit assembly 16, the hydraulic transformer 28 is operated such that an amount of fluid in the first conduit assembly 16 which corresponds to the portion of the hydraulic power which exceeds the required hydraulic power signal is guided through the second port 32 of the hydraulic transformer 28 to thereby increase the pressure in the accumulator 38.

In view of the above, it should be noted that in the embodiment of a hydraulic system 10 such as the one illustrated in FIG. 4, the first hydraulic machine 14 is adapted to produce a hydraulic power with slow variations in time whereas the hydraulic transformer 28 may be used for producing hydraulic power with rapid variations in time, or at least not as slow varying as the variations in the hydraulic power supplied by the first hydraulic machine 14.

Figure 5:
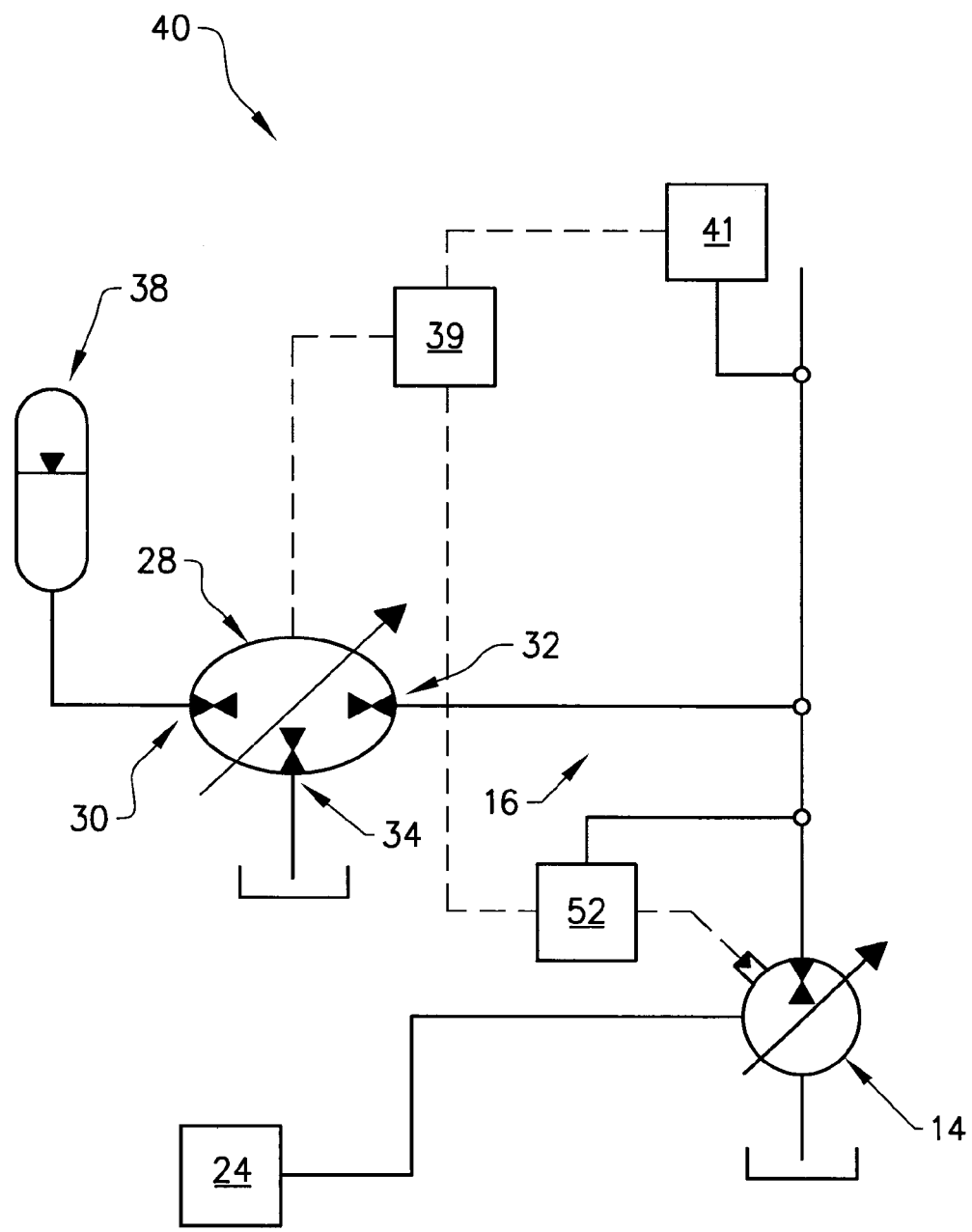
FIG. 5 illustrates another further embodiment of a hydraulic system.

FIG. 5 illustrates a portion of a further embodiment of the hydraulic system 10. In the FIG. 5 embodiment of the hydraulic system 10, the control means 40, for instance the control member 39 of the control means, is adapted to determine a required hydraulic power signal and a high frequency power signal wherein the required hydraulic power signal is communicated to the first hydraulic machine 14 and the high frequency power signal is communicated to the hydraulic transformer 28. As such, the hydraulic transformer 28 will be operated so as to provide a hydraulic power which has rapid variations in time.

Moreover, the control means 40 communicates the kill required hydraulic power signal to the first hydraulic machine 14. Moreover, the control means 40 comprises a sensor 52 which is adapted to determine the hydraulic power in the first conduit assembly 16 and to control the first hydraulic machine 14 such that the difference, or at least a hydraulic power which is determined on the basis of the difference, between the full required hydraulic power signal and the hydraulic power in the first conduit assembly 16 is provided by the first hydraulic machine 14. Since the hydraulic transformer 28 is operated so as to provide a hydraulic power which has rapid variations in time, the difference between the full required hydraulic power signal and the hydraulic power in the first conduit assembly 16 will be slowly varying in time.

In further embodiments of the hydraulic system 10, components of the FIG. 4 and FIG. 5 embodiments could be combined. As such, in further embodiments of the hydraulic system 10, the control means 40 may be adapted to determine a required hydraulic power signal and to communicate a high frequency power signal to the hydraulic transformer 28 and a low frequency power signal to the first hydraulic machine 14.

Figure 6:
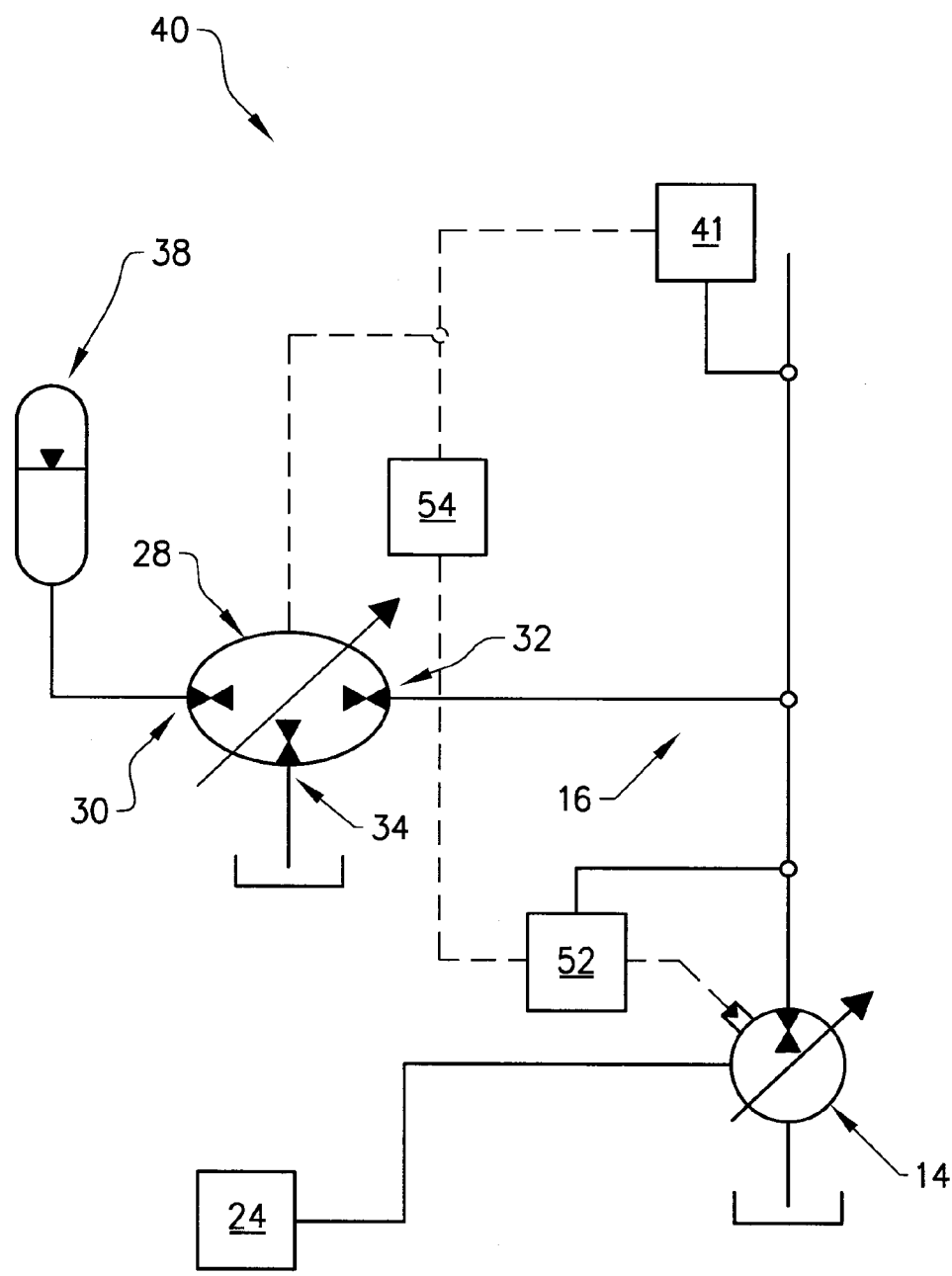
FIG. 6 illustrates a further embodiment of a hydraulic system.

Instead of, or in addition to, filtering the required hydraulic power signal, the control means 40 may comprise a time delay means 54, or time delayer, adapted to delay a response of the first hydraulic machine 14. Thus, in the embodiment illustrated in FIG. 6, the full required hydraulic power signal is communicated to the first hydraulic machine 14 as well as the hydraulic transformer 28. However, using the time delay means 54, the communication of the required hydraulic power signal is delayed a predetermined time TD before it is communicated to the first hydraulic machine 14. Purely by way of example, the predetermined time TD may be below 300-500 milliseconds. In a similar vein as for the FIG. 5 embodiment, the control means 40 may comprise a sensor 52 which is adapted to determine the hydraulic power in the first conduit assembly 16 and to control the first hydraulic machine 14 such that the difference between the full required hydraulic power signal and the hydraulic power in the first conduit assembly 16 is provided by the first hydraulic machine 14.

By virtue of the time delay means 54, relatively rapid variations—or transients—in the required hydraulic power signal may be dealt with by the hydraulic transformer 28 and the first hydraulic machine 14 may be operated so as to provide a hydraulic power which preferably only has slow variations in time. The time delay means 54 may for instance be a hydraulic time delay means and/or an electronic time delay means. Purely by way of example, a hydraulic time delay means may comprise a relatively long conduit (not shown), such as a hose. The above conduit may preferably comprise a fluid which has a large viscosity. As used herein, the expression "large viscosity" relates to a viscosity which exceeds the viscosity of the hydraulic fluid in the hydraulic system.

As has previously been indicated, the time delay means 54 as has been discussed hereinabove may be used in any one of the FIG. 4 or FIG. 5 embodiments of the present invention.

Instead of, or in addition to, any one of the embodiments presented hereinabove; embodiments of the hydraulic system may comprise a torque determining means 56, or a torque determiner. An example of such an embodiment is illustrated in FIG. 7 and will be discussed hereinbelow.

The torque determining means 56 is adapted to determine a required torque signal for the first hydraulic machine 14 in response to the required hydraulic power. The required torque signal includes only frequencies which are below a cut-of frequency which is in the range of 1-10 Hz, preferably within the range of 3-6 Hz. More preferred; the required torque signal is constant for at least a finite time period. In other words, the required torque signal ma be a stepwise constant function. Based on the required toque signal, a required displacement of the first hydraulic machine 14 may be determined and the first hydraulic machine 14 may be controlled so as to provide the required displacement. Purely by way of example, if the first hydraulic machine 14 comprises one or more swash plates (not shown), the swish angle of the first hydraulic machine 14 may be adjusted such that the torque for the first hydraulic machine 14 corresponds to the required toque.

The torque determining means 56 may comprise an electronic and/or hydraulic filter. However, in other implementations of the torque determining means 56, the torque determining means 56 may be adapted to receive an electronic required hydraulic power signal and, based on one or more predetermined rules, determine a required torque signal for the first hydraulic machine 14. Purely by way of example, the torque determining means 56 may comprise a processor and a memory (not shown). Moreover, and again purely by way of example, the memory may contain a look-up table of predetermined torque signals in relation to the present value of the required hydraulic power signal.

Figure 7:
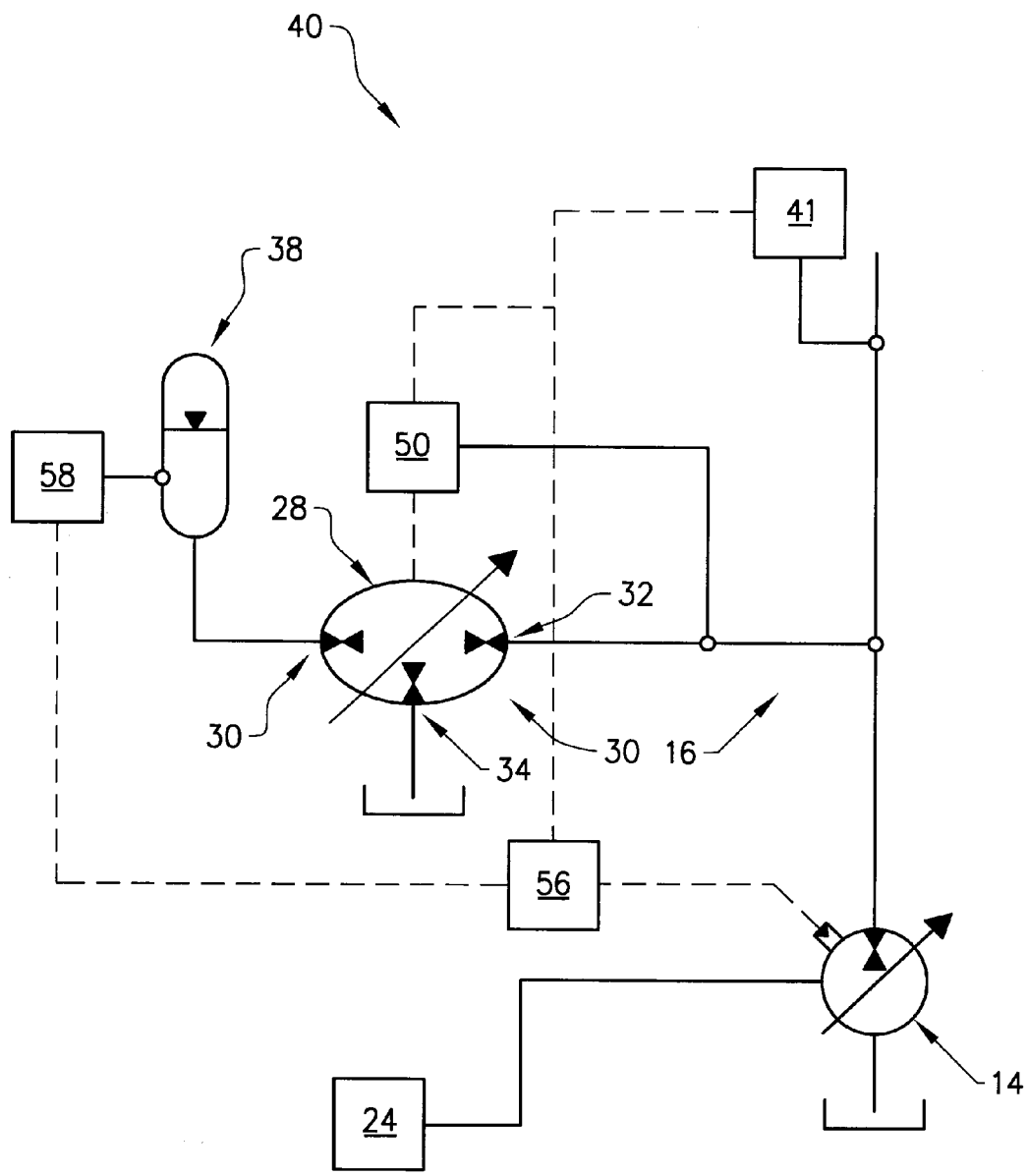
FIG. 7 illustrates another further embodiment of a hydraulic system.

As such, with the embodiment of the hydraulic system illustrated in FIG. 7, the required torque for the first hydraulic machine 14 may be slowly varying. In fact, in variants of the FIG. 7 embodiment, the required torque for the first hydraulic machine 14 may be kept constant for at least a finite time period. As such, the first hydraulic machine 14 may be operated so as to provide a more or less constant hydraulic power and temporary varying hydraulic power may consequently be provided by the hydraulic transformer 28.

FIG. 8 illustrates a further embodiment of the present invention. As may be gleaned from FIG. 8, the hydraulic system 10 illustrated therein comprises a selection valve 60 which is in fluid connection, directly or indirectly via for instance a main control valve 20, with a piston side 62 as well as a piston rod side 64 of the hydraulic actuator 12. As such, when the hydraulic actuator 12 is actuated such that the amount of hydraulic fluid in the piston side 62 or the piston rod side 64 is reduced, at least a portion of the thus reduced hydraulic fluid may be conducted to the first port 30 of the hydraulic transformer 28 by means of the selection valve 60. As such, with an embodiment of the hydraulic system 10 such as the one illustrated in FIG. 8, energy stored in or by the hydraulic actuator 12 may be recuperated by the accumulator 38 of the FIG. 8 embodiment. The FIG. 8 selection valve 60 may be included in any one of the above discussed embodiments of the hydraulic system 10.

Moreover, FIG. 8 illustrates an embodiment of the present invention wherein the control unit 42 forms a part of the hydraulic actuator control means 40. As such, in the embodiment illustrated in FIG. 8, the control unit 42 may be adapted to be in communication with an actuator 44 as well as a pressure sensor and/or a flow sensor 41. The control unit 42 may also be adapted to communicate with the hydraulic transformer 28 and the first hydraulic machine 14 in order to request portions of the required hydraulic power.

Each one of the embodiments of the hydraulic system 10 as has been presented hereinabove may preferably also comprise an accumulator pressure sensor 58 adapted to determine a pressure in the accumulator 38, see e.g. FIG. 7. The hydraulic actuator control means 40 is adapted to increase the pressure in the accumulator 38, by operating the first hydraulic machine 14, when the pressure in the accumulator is below a predetermined pressure value. When increasing the pressure in the accumulator 38, the first hydraulic machine 14 is preferably operated such that a constant torque from the prime mover 24.

It is to be understood that the present invention is not limited to the embodiments described above and illustrated in the drawings. For instance, even though the hydraulic system of the present invention has been presented in relation to a wheel loader, the hydraulic system may be implemented in an type of work machine. Purely by way of example, the hydraulic system of the present invention may be implemented in an excavator, a grader or the like. As such, the skilled person will recognize that many changes and modifications may be made within the scope of the appended claims.

The invention claimed is:

1. A hydraulic system for a working machine, the hydraulic system comprising
a hydraulic actuator and a first hydraulic machine for supplying fluid to the hydraulic actuator,
a hydraulic transformer for supplying fluid to the hydraulic actuator in parallel with the first hydraulic machine, and an accumulator for fluid, the hydraulic transformer comprising a first port, a second port, and a third port and being adapted to transform a first pressure and a first flow at the first port to a second pressure and a second flow at the second port, the third port being in fluid communication with a tank, the second port of the hydraulic transformer being in fluid communication with the hydraulic actuator and the first port being in communication with the accumulator, and
a hydraulic actuator controller being adapted to determine a required hydraulic power for the hydraulic actuator, wherein the hydraulic actuator controller further is adapted to request a first power portion of the required hydraulic power from the hydraulic transformer and a second power portion of the required hydraulic power from the first hydraulic machine,
wherein the hydraulic system comprises a first conduit assembly, the first conduit assembly comprising one or more conduits and a main control valve connected to the actuator, and the first hydraulic machine is adapted to supply fluid to the hydraulic actuator via the first conduit assembly, the second port of the hydraulic transformer being in parallel with the first hydraulic machine in the first conduit assembly on a side of the main control valve opposite the actuator.

2. The hydraulic system according to claim 1, wherein the system comprises a time delayer adapted to delay a response of the first hydraulic machine.

3. The hydraulic system according to claim 1, wherein the system comprises a torque determiner, the torque determiner being adapted to determine a required torque signal for the first hydraulic machine in response to the required hydraulic power, the required torque signal including only frequencies which are below a cut-of frequency which is in the range of 1-10 Hz.

4. The hydraulic system according to claim 1, wherein the system further comprises an accumulator pressure sensor adapted to determine a pressure in the accumulator, the hydraulic actuator controller being adapted to increase the pressure in the accumulator, by operating the first hydraulic machine, when the pressure in the accumulator is below a predetermined pressure value.

5. A work machine comprising a hydraulic system claim 1.

6. The work machine according to claim 5, wherein the work machine comprises an engine which is adapted to drive the first hydraulic machine.

7. A hydraulic system for a working machine, the hydraulic system comprising
- a hydraulic actuator and a first hydraulic machine for supplying fluid to the hydraulic actuator,
- a hydraulic transformer for supplying fluid to the hydraulic actuator in parallel with the first hydraulic machine, and an accumulator for fluid, the hydraulic transformer comprising a first port a second port, and a third port and being adapted to transform a first pressure and a first flow at the first port to a second pressure and a second flow at the second port, the third port being in fluid communication with a tank, the second port of the hydraulic transformer being in fluid communication with the hydraulic actuator and the first port being in communication with the accumulator, and
- a hydraulic actuator controller being adapted to determine a required hydraulic power for the hydraulic actuator, wherein the hydraulic actuator controller further is adapted to request a first power portion of the required hydraulic power from the hydraulic transformer and a second power portion of the required hydraulic power from the first hydraulic machine,
- wherein the hydraulic actuator controller is adapted to determine a required hydraulic power signal and to convert the required hydraulic power signal into a high frequency power signal and a low frequency power signal.

8. The hydraulic system according to claim 7, wherein the hydraulic actuator controller comprises a hydraulic signal filter.

9. The hydraulic system according to claim 7, wherein the hydraulic actuator controller is adapted to determine a required hydraulic power electronic signal, the hydraulic actuator controller further comprises an electronic filter.

10. The hydraulic system according to claim 7, wherein the high frequency power signal includes a portion of the required hydraulic power signal which contains frequencies of the required hydraulic power signal which are equal to or above a cut-of frequency which is in the range of 1-10 Hz, and the low frequency power signal includes a portion of the required hydraulic power signal which includes frequencies of the required hydraulic power signal which are below the cut-of frequency.

11. A method for controlling a hydraulic system, the hydraulic system comprising a hydraulic actuator and a first hydraulic machine for supplying hydraulic fluid to the hydraulic actuator, and a hydraulic transformer for supplying fluid to the hydraulic actuator in parallel with the first hydraulic machine, and an accumulator for fluid, the hydraulic transformer comprising a first port, a second port, and a third port and being adapted to transform a first pressure and a first flow at the first port to a second pressure and a second flow at the second port, the third port being in fluid communication with a tank, the second port of the hydraulic transformer being in fluid communication with the hydraulic actuator and the first port being in fluid communication with the accumulator, and a hydraulic actuator controller for determining a required hydraulic power for the hydraulic actuator, the hydraulic system comprising a first conduit assembly, the first conduit assembly comprising one or more conduits and a main control valve connected to the actuator, and the first hydraulic machine being adapted to supply fluid to the hydraulic actuator via the first conduit assembly, the second port of the hydraulic transformer being in parallel with the first hydraulic machine in the first conduit assembly on a side of the main control valve opposite the actuator, the method comprising:
- determining a required hydraulic power for the hydraulic actuator using the hydraulic actuator controller,
- requesting a first power portion of the required hydraulic power from the hydraulic transformer,
- requesting a second power portion of the required hydraulic power from the first hydraulic machine, and
- supplying fluid to the hydraulic actuator via the hydraulic transformer, the first hydraulic machine, and the first conduit assembly.

12. The method according to claim 11, wherein the method comprises:
- delaying the request of the second power portion for a predetermined delay time.

13. The method according to claim 11, wherein the first hydraulic machine is adapted to be driven by an engine, the engine being adapted to impart a torque on the first hydraulic machine, the method comprising:
- determining a requested torque from the engine, and
- issuing a signal to the engine such that the requested torque is obtained.

14. The method according to claim 11, wherein the method further comprising:
- determining a pressure in the accumulator;
- if the pressure in the accumulator is below a predetermined pressure value, operating the first hydraulic machine such that the pressure in the accumulator increases.

15. A method for controlling a hydraulic system, the hydraulic system comprising a hydraulic actuator and a first hydraulic machine for supplying hydraulic fluid to the hydraulic actuator, and a hydraulic transformer for supplying fluid to the hydraulic actuator in parallel with the first hydraulic machine, and an accumulator for fluid, the hydraulic transformer comprising a first port, a second port, and a third port and being adapted to transform a first pressure and a first flow at the first port to a second pressure and a second flow at the second port, the third port being in fluid communication with a tank, the second port of the hydraulic transformer being in fluid communication with the hydraulic actuator and the first port being in fluid communication with the accumulator, and a hydraulic actuator controller for determining a required hydraulic power for the hydraulic actuator, the method comprising:
- determining a required hydraulic power for the hydraulic actuator using the hydraulic actuator controller,
- requesting a first power portion of the required hydraulic power from the hydraulic transformer,
- requesting a second power portion of the required hydraulic power from the first hydraulic machine, and
- determining a required hydraulic power signal and converting the required hydraulic power signal into a high frequency power signal and a low frequency power signal.

* * * * *